(12) United States Patent
Long

(10) Patent No.: US 10,189,441 B2
(45) Date of Patent: Jan. 29, 2019

(54) TWO STEP SMART KEY START SYSTEM

(71) Applicant: Donna Long, Wichita Falls, TX (US)

(72) Inventor: Donna Long, Wichita Falls, TX (US)

( * ) Notice: Subject to any disclaimer, the term of this patent is extended or adjusted under 35 U.S.C. 154(b) by 0 days.

(21) Appl. No.: 15/959,029

(22) Filed: Apr. 20, 2018

(65) Prior Publication Data

US 2018/0236973 A1 Aug. 23, 2018

Related U.S. Application Data

(60) Continuation of application No. 14/036,250, filed on Sep. 25, 2013, which is a division of application No. 12/858,071, filed on Aug. 17, 2010, now Pat. No. 8,548,645.

(60) Provisional application No. 61/234,434, filed on Aug. 17, 2009.

(51) Int. Cl.
*G06F 7/00* (2006.01)
*B60R 25/045* (2013.01)

(52) U.S. Cl.
CPC .......... *B60R 25/045* (2013.01); *G06F 7/00* (2013.01); *Y10T 70/5956* (2015.04)

(58) Field of Classification Search
CPC ............ B60R 25/00; B60R 25/02–25/06
USPC ........... 701/2; 307/10.1, 10.4, 10.6; 713/186
See application file for complete search history.

(56) References Cited

U.S. PATENT DOCUMENTS

| | | | |
|---|---|---|---|
| 5,150,593 A * | 9/1992 | Kobayashi | B60R 25/066 192/219.4 |
| 6,038,666 A * | 3/2000 | Hsu | G07C 9/00087 380/285 |
| 6,236,120 B1 * | 5/2001 | Loraas | B60R 25/04 307/10.1 |
| 6,274,946 B1 * | 8/2001 | Maeda | B60Q 1/1476 307/10.1 |
| 6,653,747 B1 * | 11/2003 | Proefke | B60R 25/24 307/10.6 |
| 6,727,800 B1 * | 4/2004 | Dutu | B60R 25/02102 123/179.1 |
| 7,392,675 B2 * | 7/2008 | Kito | B60R 25/04 307/10.5 |
| 8,011,214 B2 * | 9/2011 | Katagiri | B60R 7/04 70/252 |
| 8,193,915 B2 * | 6/2012 | McCall | B60R 25/2009 340/10.1 |
| 2005/0166650 A1 * | 8/2005 | Shimura | B60R 25/04 70/252 |
| 2009/0031767 A1 * | 2/2009 | Ko | B60R 25/04 70/336 |
| 2009/0151412 A1 * | 6/2009 | Chung | B60R 25/066 70/247 |
| 2011/0040426 A1 * | 2/2011 | Long | B60R 25/045 701/2 |

* cited by examiner

*Primary Examiner* — Thomas G Black
*Assistant Examiner* — Wae L Louie
(74) *Attorney, Agent, or Firm* — Braxton Perrone, PLLC

(57) ABSTRACT

A ignition start system in which authentication of a key is carried out twice, first to activate the ignition switch to allow starting the engine and second at the time when the brake pedal is depressed to put the car in a drive gear. The two step authentication prevents driving off in a car that has been started without having the key for security purposes and also to avoid inconvenient situations that can otherwise occur.

14 Claims, 2 Drawing Sheets

TWO STEP SMART KEY START SYSTEM

PRIORITY

The present application is a continuation of U.S. patent application Ser. No. 14/036,250, filed Sep. 25, 2013, which is a divisional of U.S. patent application Ser. No. 12/858,071, filed Aug. 17, 2010, now U.S. Pat. No. 8,548,645, issued on Oct. 1, 2013, which claims the benefit of U.S. Provisional Application No. 61/234,434 filed on Aug. 17, 2009, all of which are hereby incorporated herein by reference in their entirety and made part of the present application.

BACKGROUND OF THE INVENTION

This invention concerns keyless automobile lock and ignition systems (often referred to as smart key) in which the presence of a key fob is electronically detected by means of a radio pulse transponder in the key fob and antennas in the car body. In these systems, the car is unlocked automatically when the handle is operated or a button pushed. Locking is accomplished in a similar way or by simply walking away.

The ignition switch is also operated without the need to insert a key into the ignition switch lock by the same wireless detection of the presence of the key fob in the passenger compartment. The system neutralizes the electronic immobilizer usually now included in automobile electronics and allows starting the car by simply pushing a button or turning the ignition switch without the need to insert a key into the switch.

While very convenient, this system creates possibilities of security risks and also allows inconvenient situations to inadvertently arise.

For example, if after starting, the driver momentarily exits the car and somehow leaves the key fob somewhere before reentering the car, he or she can drive off, and then after reaching a destination cannot restart the car since the key fob is not present. A manual operation using the key is also not possible if the key is left with the fob.

While a warning message is displayed on the instrument panel in some designs, indicating that the key fob is not detected by the system, it is easy to not notice this displayed message which may be blocked by the steering wheel.

In another common situation which could be encountered, if a driver allows a valet attendant to drive off with the car, if the driver does not give the key fob to the attendant, the attendant will be unable to start the car when retrieving the car until after obtaining the key fob from the driver, slowing the return of the car to the driver.

Also, if the valet forgets to surrender the key fob to the owner, the owner can unknowingly drive away without the key fob and subsequently be unable to restart the car (which usually is left running while the attendant gets out and the owner enters the car).

Security risks can also arise, as where a car is inadvertently left running (which can be very quiet and nearly undetectable in many cars) and with the doors unlocked, such that a thief can simply enter and drive off in the car.

With newer locking systems, it is easy for a driver to think the car has been locked when in fact the locking has not been accomplished.

Again, beep cues or visual displays can easily be missed, particularly when a driver is in a hurry.

It is also known to lock the transmission shift lever until the key fob is authenticated by the smart key controller system as described in U.S. 2009/0151412A1. However, once authentication has occurred in that system, the transmission shift lever can be freely operated such that the above problems are still encountered.

Accordingly, it is an object of the present invention to provide a keyless or smart key system of the type described which has a fail-safe feature that insures that the above described inconvenience or security risk situations are positively prevented without the need for particular attentiveness of the driver the location of the key fob on to related beep cues or displays.

SUMMARY OF THE INVENTION

The above recited object and other objects which will be understood upon a reading of the following specification and claims are achieved by a two-step detection authentication process in which after the presence of the key fob initially authenticated, the ignition button or switch is activated for keyless starting as in prior systems. A shift lever interlock is also included, controlled by the keyless system controller, positively preventing shifting of the transmission shift lever into a drive gear unless the owner's key-fob is detected by the system as being present within the passenger compartment at the time the driver presses the brake pedal in order to allow shifting into a drive gear.

Thus, if the car is started and idling in park (or neutral), the shift lever cannot be shifted into a drive gear, positively preventing driving the car away unless the key-fob is detected and authenticated by the system at the same time as the shifting attempt is made.

This positively prevents the inconvenient situations and security risks arising from a car being able to be driven away without the key-fob being located in the passenger compartment of the car, such that the attentiveness of the operator is not required in order to insure that such situations will not arise.

DETAILED DESCRIPTION

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Figure 1:
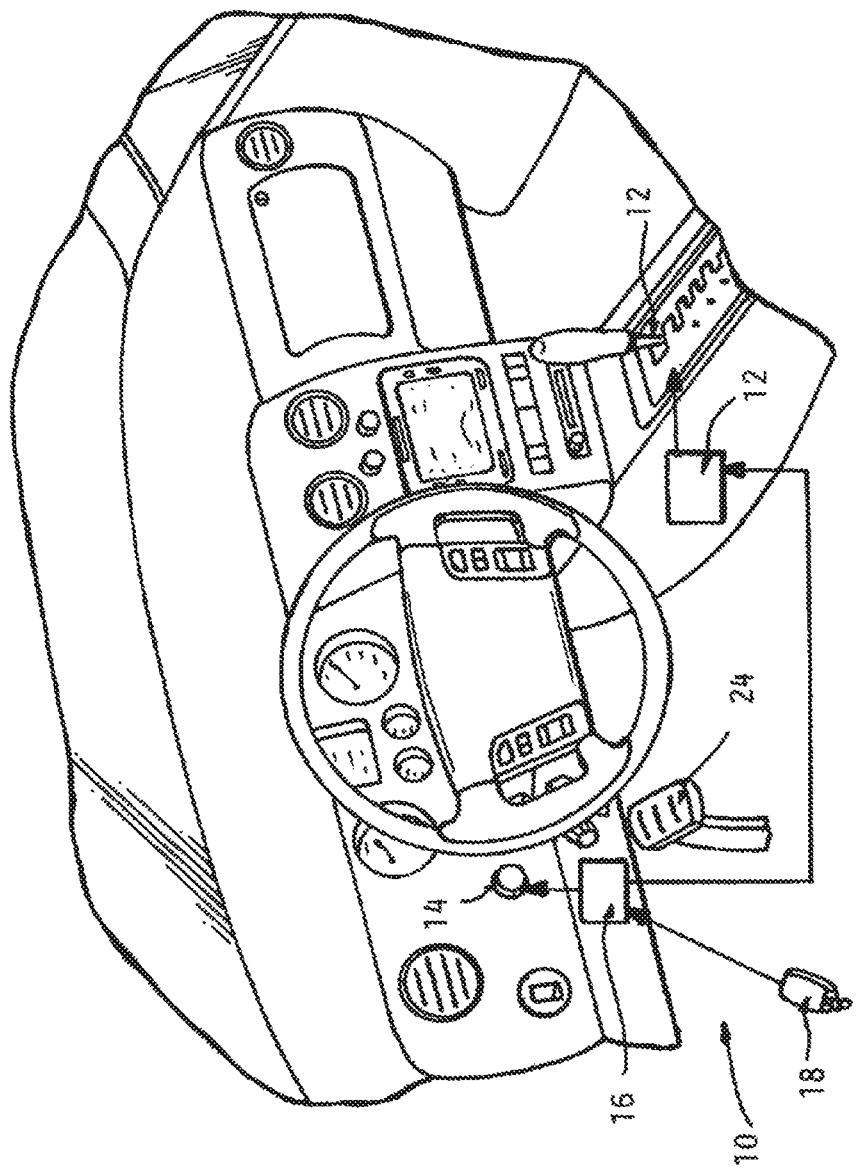
FIG. 1 is a pictorial diagrammatic view of a portion of the passenger compartment of an automobile with keyless system components included according to the present invention being depicted diagrammatically.
Figure 2:
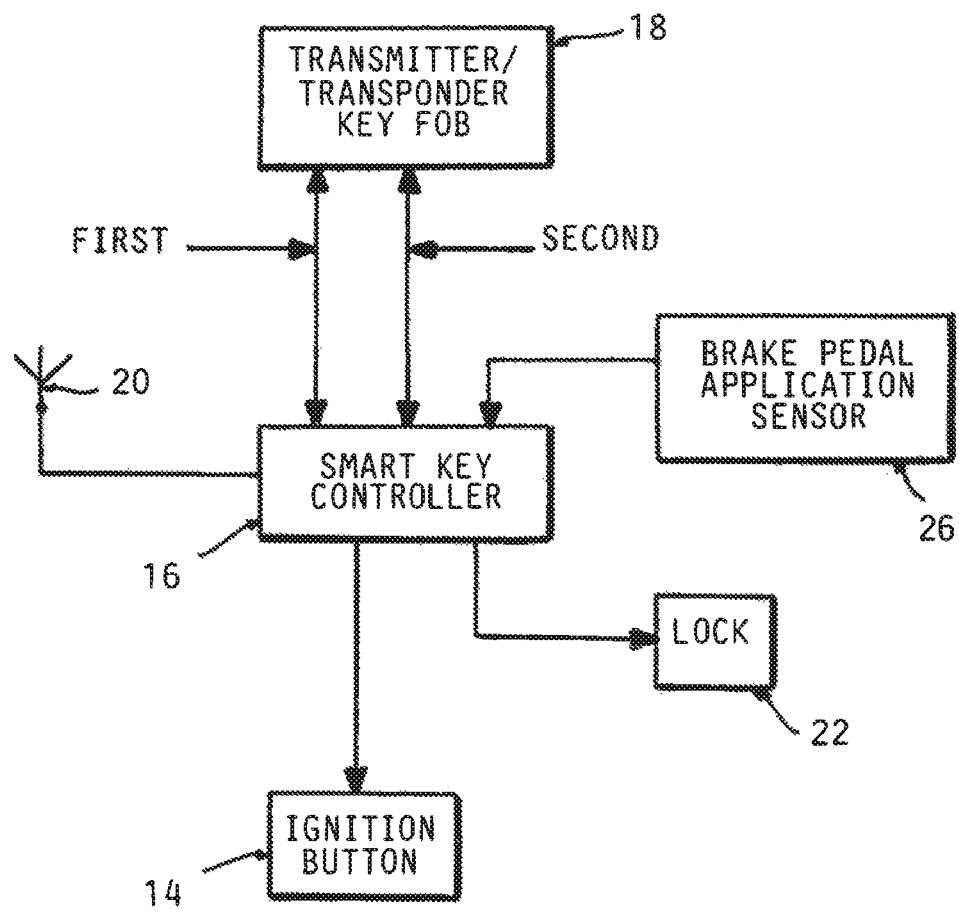
FIG. 2 is a block diagram of components of the keyless system depicting the two step detection authentication operation of the invention.

Referring to FIG. 1, a portion of the interior of an automobile passenger compartment 10 is shown in fragmentary form.

A center console mounted transmission shift lever 12 is provided in conventional fashion. A dash mounted starter button 14 is provided (or a turnable ignition switch which could also accept a key). A keyless system controller 16 is depicted diagrammatically which detects the presence of a coded key fob 18 in the passenger compartment 10 as by one or more car body mounted antennas 20 receiving transponder coded pulse codes transmitted by the key-fob 18 when interrogated by the smart key controller 16 in the well known manner.

The system controller 16 enables the ignition push button 14 when the presence of the correctly coded key fob 18 in the compartment 10 is detected and authenticated, such that the car can be started by merely pushing the button 14 without the use of a key, in the well known manner.

According to the present invention, a transmission lever lock 22 is provided, such as described in U.S. 2009/0151412A1, which positively prevents movement of the transmission selector or shift lever 12 to a drive position unless the brake pedal 24 is depressed and also unless the key fob 18 in the passenger compartment 12 is again detected and authenticated by the system controller 16.

According to the invention, such detection-authentication necessary to shift the lever 12 is not carried out at the same time as when the ignition detection-authentication is carried out. This second authentication is carried out at the time the brake pedal is pressed and a signal is generated and sent by a sensor 26 which detects the pressing of the brake pedal 24 to the smart key controller 22, which carries out a second detection authentication of the key fob 18 prior to operating the release of the transmission lever lock actuator 22.

Thus, if the key fob 18 is removed from the passenger compartment 10 after the car is started, the vehicle will not be able to be operated as the transmission lever 12 will remain locked even when the brake pedal is pressed.

This prevents operation of the vehicle even after the key fob 18 has been initially authenticated and the car started and running, and thus positively prevents operation of the vehicle unless the key fob 18 is authenticated as being within the passenger compartment.

What is claimed is:

1. A system for operating a vehicle comprising:
   a key comprising at least one electronic code; and
   a processor configured to authenticate and detect the key,
   wherein the vehicle comprises:
   a vehicle movement selector; and
   a brake system,
   wherein the processor is configured to perform a primary authentication of the at least one electronic code and detection of the key within the vehicle at the time a vehicle starter activation is attempted and again upon activation of the brake system after the vehicle is started and a secondary authentication of the at least one electronic code at the time the vehicle starter is activation is attempted and again upon activation of the brake system after the vehicle is started, and
   wherein the processor is configured to enable use of the vehicle movement selector following the primary or secondary authentication of the at least one electronic code.

2. The system of claim 1, wherein the primary authentication of the at least one electronic code enabling activation of the vehicle starter comprises detection of the key within the passenger compartment of the vehicle.

3. The system of claim 1, wherein the primary authentication of the at least one electronic code enabling use of the vehicle movement selector comprises detection of the key within the passenger compartment of the vehicle when a person is within the passenger compartment of the vehicle.

4. The system of claim 1, wherein the at least one electronic code authenticated in the first authentication is the same as the at least one electronic code authenticated in the second authentication.

5. The system of claim 1, wherein the at least one electronic code authenticated in the first authentication differs from the at least one electronic code authenticated in the second authentication.

6. The system of claim 1, wherein the key is a digital key.

7. The system of claim 1, wherein the key is a mobile coded key.

8. The system of claim 1, wherein the key communicates wirelessly with a controller.

9. The system of claim 1, wherein the key is a connected key.

10. A system for operating a vehicle comprising:
    a key comprising at least one electronic code; and
    a processor configured to authenticate and detect the key,
    wherein the vehicle comprises:
    a vehicle movement selector; and
    a brake system,
    wherein the processor is configured to perform a primary authentication of the at least one electronic code and detection of the key within the vehicle before the vehicle is started and again before movement of the vehicle from a parked position and a secondary detection of the key and authentication of the at least one electronic code at the time the vehicle starter activation is attempted and again before movement of the vehicle from a parked position, and
    wherein the processor is configured to enable use of the vehicle movement selector following the primary or secondary authentication and detection of the at least one electronic code.

11. The system of claim 10, wherein the key is a digital key.

12. The system of claim 10, wherein the key is a mobile coded key.

13. The system of claim 10, wherein the key communicates wirelessly with a controller.

14. The system of claim 10, wherein the key is a connected key.

* * * * *